US010336658B2

(12) United States Patent
Swennen et al.

(10) Patent No.: US 10,336,658 B2
(45) Date of Patent: Jul. 2, 2019

(54) PULL MAT

(71) Applicant: BONAR N.V., Zele (BE)

(72) Inventors: Ives Swennen, Hansbeke (BE); Kris Coen, Lede (BE); Tim Parrein, Ghent (BE)

(73) Assignee: IFG EXELTO NV, Ghent (Zwijnaarde) (BE)

( * ) Notice: Subject to any disclaimer, the term of this patent is extended or adjusted under 35 U.S.C. 154(b) by 270 days.

(21) Appl. No.: 14/784,216

(22) PCT Filed: Apr. 30, 2014

(86) PCT No.: PCT/EP2014/058864
§ 371 (c)(1),
(2) Date: Oct. 13, 2015

(87) PCT Pub. No.: WO2014/180733
PCT Pub. Date: Nov. 13, 2014

(65) Prior Publication Data
US 2016/0075611 A1    Mar. 17, 2016

(30) Foreign Application Priority Data
May 8, 2013    (EP) ..................... 13167036

(51) Int. Cl.
| | |
|---|---|
| D03D 1/00 | (2006.01) |
| D03D 9/00 | (2006.01) |
| C05F 17/02 | (2006.01) |
| B32B 5/02 | (2006.01) |
| B32B 5/06 | (2006.01) |
| B32B 5/26 | (2006.01) |
| B32B 7/08 | (2019.01) |
| B32B 7/12 | (2006.01) |
| A01G 18/20 | (2018.01) |
| A01G 18/00 | (2018.01) |

(52) U.S. Cl.
CPC .......... *C05F 17/0258* (2013.01); *A01G 18/20* (2018.02); *B32B 5/024* (2013.01); *B32B 5/06* (2013.01); *B32B 5/26* (2013.01); *B32B 7/08* (2013.01); *B32B 7/12* (2013.01); *A01G 18/00* (2018.02); *B32B 2250/03* (2013.01); *B32B 2250/20* (2013.01); *B32B 2255/02* (2013.01); *B32B 2262/0253* (2013.01); *B32B 2307/718* (2013.01); *B32B 2410/00* (2013.01); *Y02P 20/145* (2015.11); *Y02W 30/43* (2015.05)

(58) Field of Classification Search
CPC ........ C05F 17/0258; D03D 1/00; D03D 9/00; D03D 25/005
USPC ............... 442/2, 45, 46, 246, 255, 205, 206; 52/343; 405/302.7
See application file for complete search history.

(56) References Cited

U.S. PATENT DOCUMENTS

| | | | |
|---|---|---|---|
| 4,748,996 A | 6/1988 | Combier | |
| 7,501,360 B2 | 3/2009 | Heezen et al. | |
| 2006/0116433 A1* | 6/2006 | Lee | B29C 67/20 521/142 |
| 2007/0111623 A1* | 5/2007 | Heezen | A01G 1/04 442/181 |
| 2009/0041544 A1* | 2/2009 | Ramsey | B09B 1/00 405/129.95 |
| 2012/0128437 A1* | 5/2012 | Weiser | A01G 13/0268 405/302.7 |

FOREIGN PATENT DOCUMENTS

| | | |
|---|---|---|
| BE | 1016731 A3 | 5/2007 |
| NL | 1 026 898 C2 | 2/2006 |
| NL | 1 034 567 C2 | 1/2010 |
| WO | 2010/026227 A1 | 3/2010 |
| WO | WO 2010026227 A1 * | 3/2010 ......... A01G 13/0268 |

OTHER PUBLICATIONS

Anonymous, "Tunnel-en glijmatten," 2009, pp. 1-2, http://www.mertens-mushrooms.com/download/447-champignonLeafletTunnelmatten.pdf.
Aug. 14, 2014 Internation Search Report issued in International Application No. PCT/EP2014/058864.

* cited by examiner

*Primary Examiner* — Matthew D Matzek
(74) *Attorney, Agent, or Firm* — Oliff PLC

(57) ABSTRACT

A pull mat for tunnel composting includes: a layer of straight unidirectionally oriented threads oriented in the longitudinal direction of the pull mat, the layer including a multitude of straight individual threads which are placed essentially parallel to each other in a single plane, the straight unidirectionally oriented threads being spaced apart from each other, at least one layer of open material, the at least one layer of open material being selected from a woven fabric, a laid scrim, a nonwoven fabric, and a perforated film, and optionally, a further layer of open material, wherein when the optional further layer of open material is present, the at least one layer of open material and the further layer of open material are positioned on opposite sides of the layer of straight, unidirectionally oriented threads.

15 Claims, No Drawings

PULL MAT

BACKGROUND

Described herein is a pull mat for tunnel composting.

Pull mats are used in tunnel composting where compostable material is being composted while being placed on a pull mat. The pull mat is used to pull compost out of the composting tunnel.

Composting companies use composting tunnels wherein a substrate for mushroom culture can be produced, for example from a mixture of straw, horse manure, chicken manure and gypsum. This composting process requires three consecutive phases wherein the processing conditions in each phase are controlled. The floor of the tunnel comprises a grid through which air can be blown into the compostable material.

After each of the composting phases the compost is pulled out of the composting tunnel so that the compostable material may be mixed. The composting material may be humidified and/or spawn may be added to the compost. The pull mat is subsequently used to get the compostable material out of the composting tunnel.

The pull mat slides over so-called gliding mat which is attached to the grid in the floor of the composting tunnel. The gliding mat is applied to lower the friction as compared to direct contact of the pull mat with the grid in the floor of the composting tunnel.

A pull mat has to combine high resistance against elongation and rupture to enable easy removal of compostable material from the tunnel with highest possible air permeability to facilitate the composting process.

A pull mat preferably also minimizes friction in contact with the gliding mat.

U.S. Pat. No. 7,501,360 B2, BE 1016731 A3 and NL 1026898 C all disclose a pull mat for tunnel composting comprising a fabric of warp and weft threads having at least one strip in longitudinal direction, which has higher tensile strength and lower stretch than the areas of the fabric adjacent to at least one the strip.

NL 1034567 C discloses a composting mat comprising a woven fabric of the ajour type wherein warp and weft threads are grouped together.

BRIEF SUMMARY

It is an object of the disclosure to provide a pull mat which has a high resistance against elongation and rupture while having high air permeability.

The object of the disclosure is achieved by a pull mat according to an embodiment in which the pull mat comprises:

- a layer of straight unidirectionally oriented threads oriented in the longitudinal direction of the pull mat, the layer consisting of a multitude of straight individual threads which are placed essentially parallel to each other in a single plane, the straight unidirectionally oriented threads being spaced apart from each other
- at least one layer of open material, the at least one layer of open material being selected from the group consisting of a woven fabric, a laid scrim, a nonwoven fabric, and a perforated film, and
- optionally, a further layer of open material, wherein when the optional further layer of open material is present, the at least one layer of open material and the further layer of open material are positioned on opposite sides of the layer of straight, unidirectionally oriented threads.

DETAILED DESCRIPTION

A composite pull mat comprising a layer of straight, unidirectionally threads oriented in the longitudinal direction of the pull mat in combination with an open material layer enables that the pull mat has high tensile strength and/or high modulus in combination with high air permeability.

A layer of straight, unidirectionally threads oriented in the longitudinal direction of the pull mat is understood to consist of a multitude of straight individual threads which are placed essentially parallel to each other in a single plane. The layer of straight, unidirectionally threads explicitly does not comprise threads oriented in a direction different from the longitudinal direction in the same plane as the unidirectionally threads. The layer of straight, unidirectionally threads thus, for example, does not comprise weft threads.

The thickness of the single plane comprising the straight, unidirectionally threads oriented in the longitudinal direction of the pull mat preferably essentially equals the thickness of the individual straight, unidirectionally threads. The ratio of the thickness of the single plane comprising the straight, unidirectionally threads oriented in the longitudinal direction of the pull mat over the thickness of the individual straight, unidirectionally threads preferably is at most 1.50, more preferably at most 1.25, more preferably at most 1.10, even more preferably at most 1.05. Most preferably, the ratio of the thickness of the single plane comprising the straight, unidirectionally threads oriented in the longitudinal direction of the pull mat over the thickness of the individual straight, unidirectionally threads is 1.00.

The term essentially parallel is understood to mean that the orientation of neighbouring individual threads differs by an angle of at most 5°, preferably by an angle of at most 2°, more preferably by an angle of at most 1°, even more preferably by an angle of at most 0.5°. Most preferably, the neighbouring individual threads are oriented exactly parallel to each other.

The unidirectionally oriented threads are preferably connected to the open material layer in order to ensure that the unidirectionally oriented threads remain spaced apart at the predetermined spacing and to ensure that the unidirectionally oriented threads remain straight so that a force applied to the pull mat in the longitudinal direction of the pull mat is directly carried by the unidirectionally oriented threads. The amount of stretch of the pull mat is reduced, thereby reducing the amount of necking in of the pull mat upon removal of the compostable material from the composting tunnel.

The layer of straight unidirectionally oriented threads in the pull mat provides high tensile strength to the pull mat, which reduces the chance of rupture of the pull mat upon removal of the compostable material from the composting tunnel. The layer of straight unidirectionally oriented threads thus acts as the load carrying layer of the pull mat. Known pull mats have a woven fabric which acts as the load carrying layer of the pull mat. However, such a woven fabric effectively acts as a barrier for the air which has to be blown through the compostable material.

The unidirectionally oriented threads may comprise monofilaments, multifilament yarns and/or tapes. Preferably, the unidirectionally oriented threads have a linear density of at least 1000 dtex, more preferably at least 5000 dtex, even more preferably at least 10000 dtex, most preferably at least 12500 dtex to provide high tensile strength and/or high modulus to the pull mat.

The unidirectionally oriented threads may be any thread that has sufficiently high tensile strength and/or modulus to prevent rupture of the pull mat and/or minimizes the elongation of the pull mat due to forces applies to the pull mat upon removal of the compostable material from the composting tunnel.

Preferably, the pull mat comprises unidirectionally oriented threads having a modulus of at least 8 GPa.

The number of straight, unidirectionally oriented threads in the pull mat is preferably selected such that pull mat has a tensile strength of at least 300 kN/m, more preferably at least 350 kN/m, even more preferably at least 500 kN/m, most preferably at least 1000 kN/m.

The pull mat may comprise unidirectionally oriented threads spaced apart at a distance varying within a large range depending on the type of threads and the linear density of the threads, and the amount of compostable material placed on the pull mat. Preferably, the unidirectionally oriented threads spaced apart at a distance in the range of 0.25 mm to 250 mm, more preferably 1 mm to 100 mm, even more preferably 3 mm to 50 mm, even more preferably 5 mm to 20 mm, most preferably 10 to 15 mm.

In the first phase of the composting process a temperature of about 80° C. is applied in the composting tunnel for a period of up to approx. 60 hours. In this phase the compostable material still has a relatively high density. At the end of the first phase the pull mat must still have sufficient strength to enable the large mass of compostable material to be pulled out of the composting tunnel. Therefore, the pull mat used in the first phase of the composting process preferably has a tensile strength of at least 1000 kN/m.

In the second and third phases of the composting process the density of the compostable material has been reduced, which has the consequence that the mass of compostable material present on the pull mat in the composting tunnel is less than in the first phase. Therefore, a pull mat used in the second and/or third phase of the composting process may have a tensile strength of at least 350 kN/m.

Although the unidirectionally oriented threads may be any thread that has sufficiently high tensile strength and/or modulus, the unidirectionally oriented threads are preferably made from a material which has high thermal and chemical resistance against the acidic environment which may be present in the composting process. Preferably, the unidirectionally oriented threads are made from polyolefin.

The unidirectionally oriented threads may advantageously be made from polypropylene as polypropylene threads may provide sufficient tensile strength to the pull mat, in particular for the second and/or third phase of the composting process.

The unidirectionally oriented threads may advantageously be made from ultra high molecular weight polyethylene, in particular to provide sufficient tensile strength and/or modulus for the first phase of the composting process.

The at least one layer of open material serves the purpose of being a carrier material for the compostable material to prevent compostable material from falling through the grid in the floor of the composting tunnel. As the composting process is accelerated when air is blown through the compostable material, the pull mat has a high air permeability. Pull mats known in the art have air permeability of about 1500 l/m$^2$ sec at 100 Pa pressure difference (according ISO 9237-1995).

The at least one layer of open material in the pull mat according to embodiments has an openness such that the pull mat has an air permeability of at least 1200 l/m$^2$ sec, preferably at least 2000 l/m$^2$ sec, preferably at least 2500 l/m$^2$ sec, more preferably at least 3000 l/m$^2$ sec, even more preferably at least 3500 l/m$^2$ sec, most preferably at least 4000 l/m$^2$ sec.

The at least one layer of open material may be a woven fabric, a laid scrim, a nonwoven fabric or a perforated film.

Preferably, the at least one layer of open material has an air permeability of at least 1200 l/m$^2$ sec, more preferably at least 2000 l/m$^2$ sec, more preferably at least 2500 l/m$^2$ sec, more preferably at least 3000 l/m$^2$ sec, even more preferably at least 3500 l/m$^2$ sec, most preferably at least 4000 l/m$^2$ sec when measured separately.

The term nonwoven fabric is understood to mean a sheet, continuous filaments, or chopped yarns of any nature or origin, that have been formed by any means into a web of essentially randomly laid fibers, and bonded together by any means, with the exception of weaving or knitting and with the exception of paper.

The openness of the layer of open material is understood to be the total open area of the layer of open material divided by the total area of the layer of open material defined by the multiplication of the length and width of the layer. For example, when the layer of open material is a woven fabric, the total open area is the sum of the area of all openings formed between the warp and the weft threads. When the layer of open material is a perforated film, the total open area is the sum of the area of all perforations. When the layer of open material is a nonwoven fabric, the total open area is the sum of the area of all the pores formed between the fibers and/or filaments of the nonwoven fabric.

A woven fabric forming the at least one layer of open material may be of any construction which provides sufficient openness to allow the pull mat to have an air permeability of at least 2000 l/m$^2$ sec.

The individual openings in the woven fabric, the edges of the openings being formed by the warp and weft threads of the woven fabric, preferably have an area of at least 0.5 mm$^2$, more preferably at least 0.75 mm$^2$, most preferably at least 1 mm$^2$.

The woven may be for example of a plain weave construction or a leno construction to provide high stability to the open fabric. The woven may also be a twill to provide lower static friction with the gliding net or a satin to reduce friction when pulling the fabric and/or improve drapeability on the pulling cylinder. The woven may also comprise of a combination of these constructions to obtain the optimal combination of properties. These constructions may be combined in one woven layer or in separate layers which are held together with interconnecting threads.

A perforated film forming the at least one layer of open material may comprise perforations of any cross sectional shape, such as for example square, triangular, diamond shaped or round cross section. The perforations in the perforated film preferably have an area of at least 0.5 mm$^2$, more preferably at least 0.75 mm$^2$, most preferably at least 1 mm$^2$.

The perforated film may comprise perforations of different cross sectional area and/or of different cross sectional shape, such as for example square, triangular, diamond shaped and/or round cross section.

A laid scrim forming the at least one layer of open material may be a laid scrim of any known type provided that the openness is such that the air permeability of the pull mat is at least 2000 l/m² sec. The laid scrim may for example be a biaxial scrim, a triaxial scrim or a multiaxial scrim having more than three axis.

A nonwoven fabric forming the at least one layer of open material may nonwoven of any known type, for example a staple fiber nonwoven, such as a carded nonwoven or an airlaid nonwoven, or a filamentary nonwoven provided that the openness is such that the air permeability of the pull mat is at least 2000 l/m² sec.

The pull mat may comprise a further layer of open material of any type discussed above. Preferably, the at least one layer of open material and the further layer of open material are being positioned on opposite sides of the layer of straight unidirectionally oriented threads.

The layer of open material facing the floor of the composting tunnel can be selected such to minimize the friction between the pull mat and the sliding mat connected to the grid in the floor of the composting tunnel. The straight unidirectionally oriented threads are not in direct contact with the sliding mat, which reduces the chance of damage to the straight unidirectionally oriented threads by abrasion, which improves the durability of the pull mat.

By minimizing the friction between the pull mat and the sliding mat, the tensile forces applied to the pull mat upon removal of the compostable material from the composting tunnel will be reduced which enables the use of straight unidirectionally oriented threads having lower tensile strength and/or lower modulus, and/or the reduction of the number of straight unidirectionally oriented threads per meter width of the pull mat.

The layer of open material facing the gliding mat can be selected to have a flat surface, i.e. not an undulating surface as with woven fabrics forming known pull mats. Nonwoven fabrics, laid scrims and perforated films can be manufactured to have a flat surface.

The layer of open material facing the compostable material can be selected such that compostable material will not fall through the pull mat into the grid in the floor of the composting tunnel, while shielding the straight unidirectionally oriented threads from direct contact with the compostable material, which is advantageous for improving the durability of the pull mat.

The connection of the straight unidirectionally oriented threads to the at least one layer of open material and/or to the further layer of open material may be achieved in different ways.

The connection of the straight unidirectionally oriented threads to the at least one layer of open material and/or to the further layer of open material may be achieved by applying an adhesive between the straight unidirectionally oriented threads and the at least one layer of open material and/or the further layer of open material.

The connection of the straight unidirectionally oriented threads to the at least one layer of open material and/or to the further layer of open material may also be achieved by a polymeric binder. The polymeric binder may originate from the layer of open material to be connected to the straight unidirectionally oriented threads, for example from bicomponent staple fibers or bicomponent filaments when the layer of open material is a nonwoven fabric. When the layer of open material is a woven fabric, the polymeric binder may be present in bicomponent warp and/or weft threads or the woven fabric may comprise warp and/or weft threads which acts a binder threads. For example the woven fabric may comprise two types of weft threads, for example in alternating configuration, wherein one of the types of weft threads acts as binder threads. When the layer of open material is a perforated film, the film may be co-extruded film, wherein the surface facing the straight unidirectionally oriented threads provides the polymeric binder.

Alternatively a thin film of polymeric binder may be separately introduced between the layer of open material and the straight unidirectionally oriented threads.

The connection of the straight unidirectionally oriented threads to the at least one layer of open material and/or to the further layer of open material may also be achieved by one or more stitching threads.

Each stitching thread may be a separate thread added by a known type of stitching machine.

The stitching thread may also originate from the layer of open material to which the straight unidirectionally oriented threads are to be connected, when the layer of open material is a woven fabric. A warp and/or a weft thread of the woven fabric may at predetermined intervals encapsulate a straight unidirectionally oriented thread to connect the unidirectionally oriented thread to the woven fabric. The orientation of such a warp and/or a weft thread of the woven fabric encapsulating the straight unidirectionally oriented thread is under an certain angle to the plane of the layer of straight unidirectionally threads oriented in the longitudinal direction of the pull mat, wherein the actual angle is determined by the amount of warp and/or weft threads of the woven fabric to which the straight unidirectionally oriented threads are to be connected and the binding pattern. Preferably, the angle between such a warp and/or a weft thread of the woven fabric encapsulating the straight unidirectionally oriented thread and the plane in which the straight unidirectionally oriented threads are comprised is at least 10°, more preferably at least 20°, even more preferably at least 30°, most preferably at least 45°.

When the straight unidirectionally oriented threads are to be connected to the at least one layer of open material and to the further layer of open material, being positioned on opposite sides of the layer of straight unidirectionally oriented threads, a warp and/or a weft thread of the woven fabric forming the at least one open layer may encapsulate a straight unidirectionally oriented thread and continue to be part of the woven fabric forming the further open layer, thus creating an interconnecting woven structure sandwiching the layer of straight unidirectionally threads. The layer of straight unidirectionally threads oriented in the longitudinal direction of the pull mat is thereby connected to the at least one layer of open material and to the further layer of open material without any other threads being comprised and/or oriented at a direction different from the longitudinal direction in the same plane as the layer of unidirectionally threads oriented in the longitudinal direction. In this embodiment, the pull mat may be considered to be a double weave comprising the straight unidirectionally threads oriented in the longitudinal direction as filling warp threads, wherein the straight unidirectionally threads are embedded between two layers of interwoven woven fabrics without the embedded straight unidirectionally threads contributing to the cohesion of the double weave woven fabric.

A woven fabric forming the at least one layer of open material may also be woven in such a way that at the location where a straight unidirectionally oriented thread is to be connected to the layer of open material, the woven fabric forms two separated woven layers, each woven layer of the woven fabric being positioned on opposite sides of the straight unidirectionally oriented thread. The woven fabric thus comprises alternating sections of a single woven layer and sections of two woven layers.

The at least one layer of open material and/or the further layer of open material may also be formed by one or two knitted fabrics.

Known pull mats having a woven fabric as load carrying layer are generally manufactured on a shuttle weaving machine to ensure that the selvedges of the woven fabric are sufficiently strong and do not fray. On a shuttle weaving machine a single weft thread is inserted from one side of the fabric the other side and back again, thereby forming loops at the selvedges of the woven fabric. This type of weaving process is slow and expensive.

The pull mat according to embodiments does not need to be manufactured on a shuttle weaving machine, but may for example be manufactured on projectile or rapier weaving machines, which enables to reduce production costs of the pull mat.

EXAMPLES

Example 1

A pull mat was manufactured comprising a layer of straight, unidirectionally oriented threads made of ultra high molecular weight polyethylene, spaced apart from each other at a distance of 1.33 cm. The threads of were multi-filament Dyneema yarns of 1876 dtex.

On both sides of this layer of unidirectionally oriented threads a woven fabric, type Bontec HF1300 of Bonar Technical Fabrics, having a weight of 95 g/m² was stitched. The woven fabric comprised openings of about 1 mm².

The average air permeability of the pull mat was 3980 l/m² sec as determined according to ISO 9237-1995 at a pressure difference of 100 Pa with a gauge surface of 20 cm² using a Textest FX 3300 testing apparatus. The average air permeability has been calculated from 10 individual measurements.

Example 2

A pull mat was manufactured comprising a layer of straight, unidirectionally oriented threads made of ultra high molecular weight polyethylene, spaced apart from each other at a distance of 1.50 cm. The threads of were multi-filament Dyneema yarns of 1408 tex.

On both sides of this layer of unidirectionally oriented threads a plain weave woven fabric, comprising polyethylene monofilaments of 115 tex having a width of 0.39 mm both as warp and weft threads, wherein the woven fabric comprises 5 warp threads per cm and 8 weft threads per cm.

The pull mat is an interconnected woven structure sandwiching the layer of straight unidirectionally threads, wherein the number of threads from the first woven fabric encapsulating the straight unidirectionally oriented threads and continue to be part of the woven fabric forming the further open layer, is 5.33 per cm².

The average air permeability of the pull mat was 4127 l/m² sec as determined according to ISO 9237-1995 at a pressure difference of 100 Pa with a gauge surface of 20 cm² using a Textest FX 3300 testing apparatus. The average air permeability has been calculated from 5 individual measurements.

Example 3

A pull mat was manufactured comprising a layer of straight, unidirectionally oriented threads made of ultra high molecular weight polyethylene, spaced apart from each other at a distance of 0.50 cm. The threads of were multi-filament Dyneema yarns of 1408 tex.

On both sides of this layer of unidirectionally oriented threads a plain weave woven fabric, comprising polyethylene monofilaments of 115 tex having a width of 0.39 mm both as warp and weft threads, wherein the woven fabric comprises 5 warp threads per cm and 8 weft threads per cm.

The pull mat is an interconnected woven structure sandwiching the layer of straight unidirectionally threads, wherein the number of threads from the first woven fabric encapsulating the straight unidirectionally oriented threads and continue to be part of the woven fabric forming the further open layer, is 16 per cm².

The average air permeability of the pull mat was 1204 l/m² sec as determined according to ISO 9237-1995 at a pressure difference of 100 Pa with a gauge surface of 20 cm² using a Textest FX 3300 testing apparatus. The average air permeability has been calculated from 5 individual measurements.

Example 4

A pull mat was manufactured comprising a layer of straight, unidirectionally oriented threads made of ultra high molecular weight polyethylene, spaced apart from each other at a distance of 1.50 cm. The threads of were multi-filament Dyneema yarns of 1408 tex.

On both sides of this layer of unidirectionally oriented threads a plain weave woven fabric, comprising polyethylene monofilaments of 115 tex having a width of 0.39 mm both as warp and weft threads, wherein the woven fabric comprises 5 warp threads per cm and 8 weft threads per cm.

The pull mat is an interconnected woven structure sandwiching the layer of straight unidirectionally threads, wherein the number of threads from the first woven fabric encapsulating the straight unidirectionally oriented threads and continue to be part of the woven fabric forming the further open layer, is 0.26 per cm².

The average air permeability of the pull mat was 4596 l/m² sec as determined according to ISO 9237-1995 at a pressure difference of 100 Pa with a gauge surface of 20 cm² using a Textest FX 3300 testing apparatus. The average air permeability has been calculated from 5 individual measurements.

Example 5

A pull mat was manufactured comprising a layer of straight, unidirectionally oriented threads made of ultra high molecular weight polyethylene, spaced apart from each other at a distance of 0.50 cm. The threads of were multi-filament Dyneema yarns of 1408 tex.

On both sides of this layer of unidirectionally oriented threads a plain weave woven fabric, comprising polyethylene monofilaments of 115 tex having a width of 0.39 mm both as warp and weft threads, wherein the woven fabric comprises 5 warp threads per cm and 8 weft threads per cm.

The pull mat is an interconnected woven structure sandwiching the layer of straight unidirectionally threads, wherein the number of threads from the first woven fabric encapsulating the straight unidirectionally oriented threads and continue to be part of the woven fabric forming the further open layer, is 0.78 per cm².

The average air permeability of the pull mat was 2152 l/m² sec as determined according to ISO 9237-1995 at a pressure difference of 100 Pa with a gauge surface of 20 cm² using a Textest FX 3300 testing apparatus. The average air permeability has been calculated from 5 individual measurements.

What is claimed is:

1. A pull mat for tunnel composting comprising:
a layer of straight, unidirectionally-oriented threads oriented in the longitudinal direction of the pull mat, the layer consisting of a multitude of straight, individual threads which are placed essentially parallel to each other in a single plane, the straight, unidirectionally-oriented threads being spaced apart from each other,
a layer of open material being a woven fabric having warp and weft threads, and
a further layer of open material being a woven fabric having warp and weft threads,
wherein the layer of open material and the further layer of open material are positioned on opposite sides of the layer of straight, unidirectionally-oriented threads, wherein the layer of open material is arranged to face a compostable material and the further layer of open material is arranged to face a floor of the composting tunnel,
wherein warp and/or weft threads of the woven fabric of said layer of open material being part of the woven fabric of said further layer of open material so that the woven fabric of said layer of open material and the woven fabric of said further layer of open material form an interconnecting woven structure sandwiching the layer of straight, unidirectionally-oriented threads, and
wherein the pull mat as an air permeability of at least 1200 l/m sec, as determined according to ISO 9237-1995 at a pressure difference of 100 Pa.

2. The pull mat according to claim 1 wherein the unidirectionally oriented threads comprise at least one selected from the group consisting of monofilaments, multifilament yarns, and tapes.

3. The pull mat according to claim 1, wherein the unidirectionally oriented threads have a modulus of 8 GPa or higher.

4. The pull mat according to claim 1, wherein the unidirectionally oriented threads are made from a polyolefin.

5. The pull mat according to claim 4 wherein the unidirectionally oriented threads are made from polypropylene.

6. The pull mat according to claim 4 wherein the unidirectionally oriented threads are made from ultra high molecular weight polyethylene.

7. A composting tunnel comprising the pull mat according to claim 1.

8. A mushroom cultivator comprising the pull mat according to claim 1.

9. The pull mat according to claim 1 wherein the straight unidirectionally oriented threads are spaced apart from each other at regular distances.

10. The pull mat according to claim 1 wherein the pull mat has an air permeability of at least 2000 l/m$^2$ sec, as determined according to ISO 9237-1995 at a pressure difference of 100 Pa.

11. The pull mat according to claim 1 wherein the pull mat has an air permeability of at least 3000 l/m$^2$ sec, as determined according to ISO 9237-1995 at a pressure difference of 100 Pa.

12. The pull mat according to claim 1 wherein the unidirectionally oriented threads comprise multifilament yarns.

13. The pull mat according to claim 12 wherein the unidirectionally oriented threads are made from ultra high molecular weight polyethylene.

14. The pull mat according to claim 1 wherein said layer of open material and said further layer of open material form a double weave woven fabric which comprises said straight unidirectionally oriented threads as filling warp threads.

15. The pull mat according to claim 14 wherein the straight unidirectionally oriented threads are embedded between two layers of interwoven fabrics, which comprise said layer of open material and said further layer of open material, without the straight unidirectionally oriented threads contributing to cohesion of the double weave woven fabric.

* * * * *